United States Patent
Chonan et al.

(10) Patent No.: US 7,243,564 B2
(45) Date of Patent: Jul. 17, 2007

(54) POWER TRANSMISSION SYSTEM OF ENGINE

(75) Inventors: Mitsugi Chonan, Tokyo (JP); Masayuki Komuro, Tokyo (JP); Toshiyuki Matsushima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/807,457

(22) Filed: Mar. 24, 2004

(65) Prior Publication Data

US 2005/0119076 A1   Jun. 2, 2005

(30) Foreign Application Priority Data

Mar. 25, 2003 (JP) ............................. 2003-082238

(51) Int. Cl.
*F16H 3/08* (2006.01)

(52) U.S. Cl. .............................. 74/329; 474/8; 474/11; 474/13; 474/14

(58) Field of Classification Search ................ 475/210, 475/211, 258; 74/329, 404; 474/8, 11, 13, 474/14

See application file for complete search history.

(56) References Cited

U.S. PATENT DOCUMENTS

| | | | | |
|---|---|---|---|---|
| 3,630,010 A | * | 12/1971 | Rester .......................... | 56/13.5 |
| 4,304,150 A | * | 12/1981 | Lupo et al. .................... | 475/51 |
| 4,392,394 A | * | 7/1983 | Hofbauer et al. ............ | 475/204 |
| 4,458,318 A | * | 7/1984 | Smit et al. .................... | 701/51 |
| 4,504,247 A | * | 3/1985 | Chana et al. .................. | 474/17 |
| 4,530,256 A | * | 7/1985 | Hattori .......................... | 474/28 |
| 4,560,369 A | * | 12/1985 | Hattori .......................... | 474/28 |
| 4,602,525 A | * | 7/1986 | Moroto et al. ............... | 475/210 |
| 5,193,634 A | * | 3/1993 | Masut .......................... | 180/65.2 |
| 6,749,530 B2 | * | 6/2004 | Okano et al. ................. | 474/28 |
| 6,755,090 B2 | * | 6/2004 | Ima .............................. | 74/330 |
| 6,875,152 B2 | * | 4/2005 | Iwatuki et al. ................ | 477/44 |
| 6,902,502 B2 | * | 6/2005 | Murakami et al. ............ | 474/23 |
| 2001/0007293 A1 | * | 7/2001 | Yamauchi .................... | 180/219 |
| 2002/0033295 A1 | * | 3/2002 | Korenjak et al. ............ | 180/292 |
| 2003/0092529 A1 | * | 5/2003 | Gu et al. ...................... | 477/44 |

(Continued)

FOREIGN PATENT DOCUMENTS

JP   04285354 A   * 10/1992

(Continued)

OTHER PUBLICATIONS

Copending U.S. Appl. No. 10/807,455, filed Mar. 24, 2004.

*Primary Examiner*—David D. Le
(74) *Attorney, Agent, or Firm*—Smith, Gambrell & Russell LLP

(57) ABSTRACT

The power transmission system of an engine is mounted on the all-terrain vehicle and has a crankshaft driven by the engine and the crankshaft is arranged in a direction of width of a vehicle body. A sub-shaft is arranged parallel to the crankshaft and the rotation of the crankshaft is transmitted to the sub-shaft via gears. A primary shaft is concentrically mounted on the sub-shaft and is provided with a primary pulley having a variable groove width. A secondary pulley coupled to the primary pulley via a V-belt and having a variable groove width. The rotation of the crankshaft is transmitted to the primary shaft via the sub-shaft arranged parallel to the crankshaft.

18 Claims, 5 Drawing Sheets

U.S. PATENT DOCUMENTS

2004/0094343 A1* 5/2004 Fukuda ............... 180/68.2
2004/0209725 A1* 10/2004 Chonan et al. ............ 475/210

FOREIGN PATENT DOCUMENTS

| JP | 10-297294 | 11/1998 |
| JP | 11334393 | 12/1999 |
| JP | 2001097273 | 4/2001 |
| JP | 2001106158 | 4/2001 |
| JP | 2001221307 | 8/2001 |
| JP | 2002-068070 | 3/2002 |

* cited by examiner

POWER TRANSMISSION SYSTEM OF ENGINE

TECHNICAL FIELD OF THE INVENTION

The present invention relates to a power transmission system of an engine mounted on an all terrain vehicle such as a buggy.

BACKGROUND OF THE INVENTION

A rough terrain vehicle or an all-terrain vehicle which is also called a buggy is a four-wheel off-road vehicle for one person and is used as a recreational vehicle for hunting and trail touring and is also used as a practical vehicle for agriculture. In such an all-terrain vehicle, an engine is mounted in a lateral direction in a vehicle body such that a crankshaft extends in a direction of vehicle width and a power transmission system for transmitting engine power to driving wheels is provided with a forward/backward switching mechanism, a belt type continuously variable transmission, a centrifugal clutch and the like (see Japanese Patent Application Laid-open Nos. 10-297294 and 2002-68070)

In a conventional all-terrain vehicle, an engine is mounted in a lateral direction in a vehicle body such that a crankshaft extends in a direction of vehicle width and on the front side of a rider's seat. Then, the crankshaft, a primary shaft of a continuously variable transmission to which the rotation of the crankshaft is transmitted, and a centrifugal clutch for transmitting the rotation of the crankshaft to the primary shaft at a time when the number of revolutions of the crankshaft is more than a predetermined number are concentrically mounted in the vehicle body. When the crankshaft, the primary shaft and the centrifugal clutch are concentrically arranged in this manner, a shaft length including the crankshaft and the primary shaft arranged concentrically with the crankshaft via the centrifugal clutch is elongated and hence the power transmission system for transmitting the engine power to driving wheels is elongated in size in a direction of width of the vehicle.

In the all-terrain vehicle, the power transmission system is arranged in the region from the front side of a seat toward a portion directly below the seat and a rider sits astride the seat to drive the vehicle. For this reason, when the power transmission system is elongated in size in a direction of width of the vehicle, the rider needs not only to drive the vehicle with his crotch widely opened when he drives the vehicle but also to open his crotch widely when he rides on and off the vehicle. Hence, the arrangement of the power transmission system of the conventional all-terrain vehicle raises a problem that the vehicle is hard to ride.

SUMMARY OF THE INVENTION

An object of the present invention is to reduce a power transmission system of an all-terrain vehicle in size in a direction of width of a vehicle.

Another object of the present invention is to make a rider ride on or off a vehicle easily.

A power transmission system of an engine in accordance with the present invention is characterized in that a power transmission system of an engine for transmitting engine power to a driving wheel includes: a crankshaft which is driven by the engine and is arranged in a vehicle body in a direction of width of the vehicle body; a sub-shaft which is arranged parallel to the crankshaft and to which the rotation of the crankshaft is transmitted via a rotary transmission member; and a belt type continuously variable transmission having a primary shaft which is arranged concentrically with the sub-shaft and is provided with a primary pulley having a variable groove width and a secondary shaft which is provided with a secondary pulley coupled to the primary pulley via a belt and having a variable groove width, and in that the rotation of the crankshaft is transmitted to the primary shaft via the sub-shaft arranged parallel to the primary shaft.

Further, the power transmission system of an engine in accordance with the present invention is characterized in that a centrifugal clutch is arranged between the sub-shaft and the primary shaft and in that the crankshaft is mounted with a generator and in that the sub-shaft is mounted with a recoil starter.

In the power transmission system of an engine in accordance with the present invention, the crankshaft is arranged parallel to the primary shaft of the continuously variable transmission and the sub-shaft which is arranged parallel to the crankshaft and to which the rotation of the crankshaft is transmitted via the rotary transmission member is arranged concentrically with the primary shaft. Hence, the power transmission system has a three-shaft structure in which the crankshaft, the primary shaft and a secondary shaft are arranged parallel to each other. With this, in a case where the engine is mounted in a lateral direction in the vehicle body, the power transmission system can be reduced in size in a direction of vehicle width. Since the power transmission system mounted under a saddle type seat is reduced in size in a direction of vehicle width, a rider can easily ride on or off the vehicle.

DESCRIPTION OF THE PREFERRED EMBODIMENTS

Figure 1:
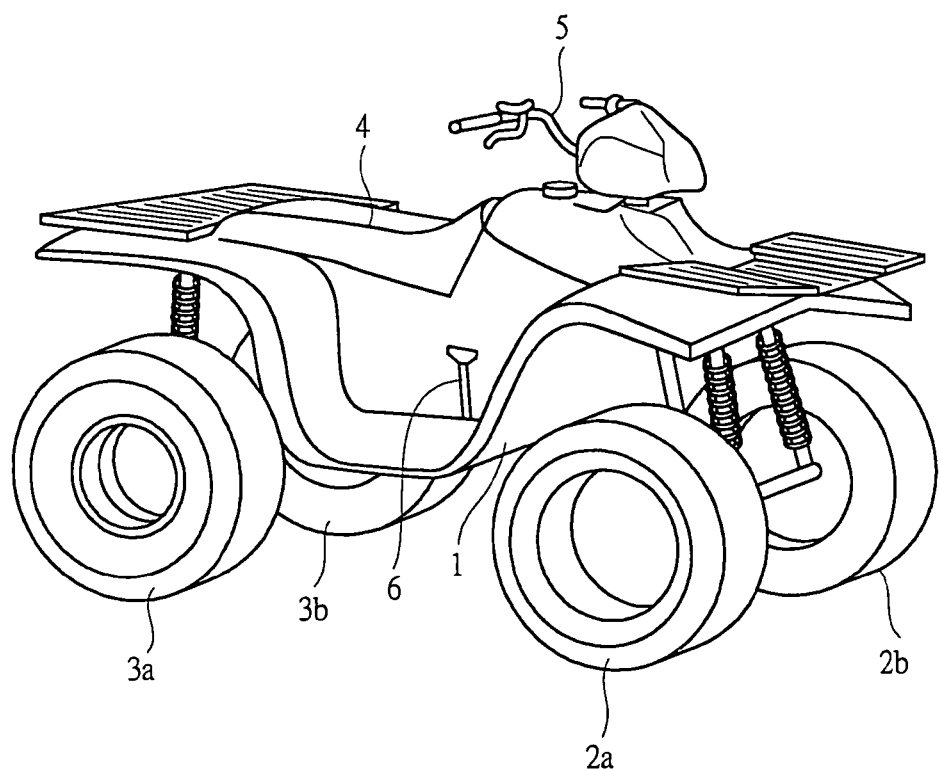
FIG. 1 is a perspective view showing one example of an all-terrain vehicle.

The preferred embodiment of the present invention will be described in detail with reference to the drawings. FIG. 1 is a perspective view showing one example of a rough terrain vehicle or an all-terrain vehicle (ATV) which is also called a buggy. A vehicle body 1 is provided with front wheels 2a, 2b and rear wheels 3a, 3b and a saddle type seat 4 is provided in the center of the vehicle body 1. A rider sitting on the seat 4 operates a handlebar 5 to drive the vehicle 1.

Figure 2:
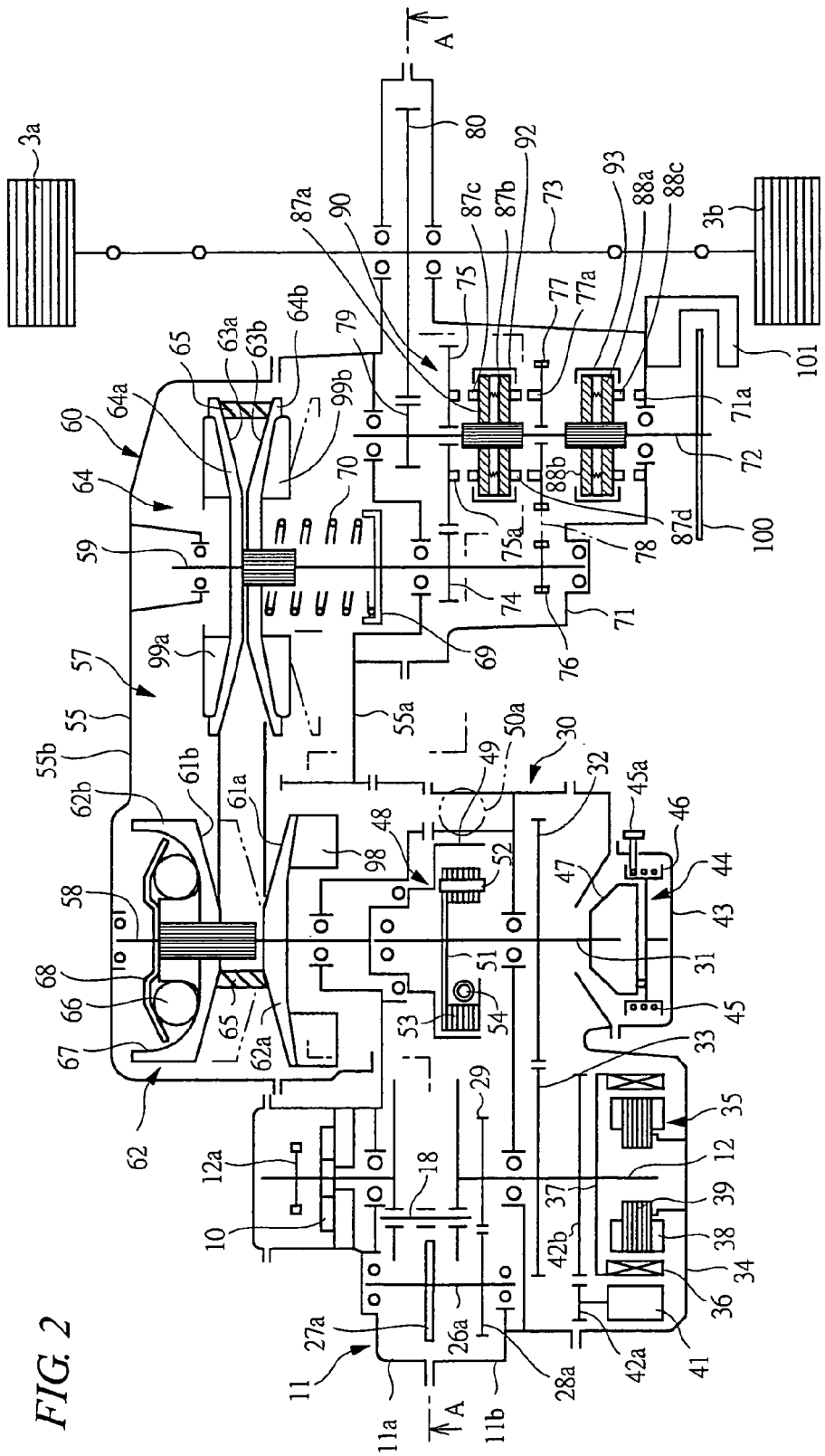
FIG. 2 is a schematic view showing a power transmission system mounted in the all-terrain vehicle shown in FIG. 1.
Figure 3:
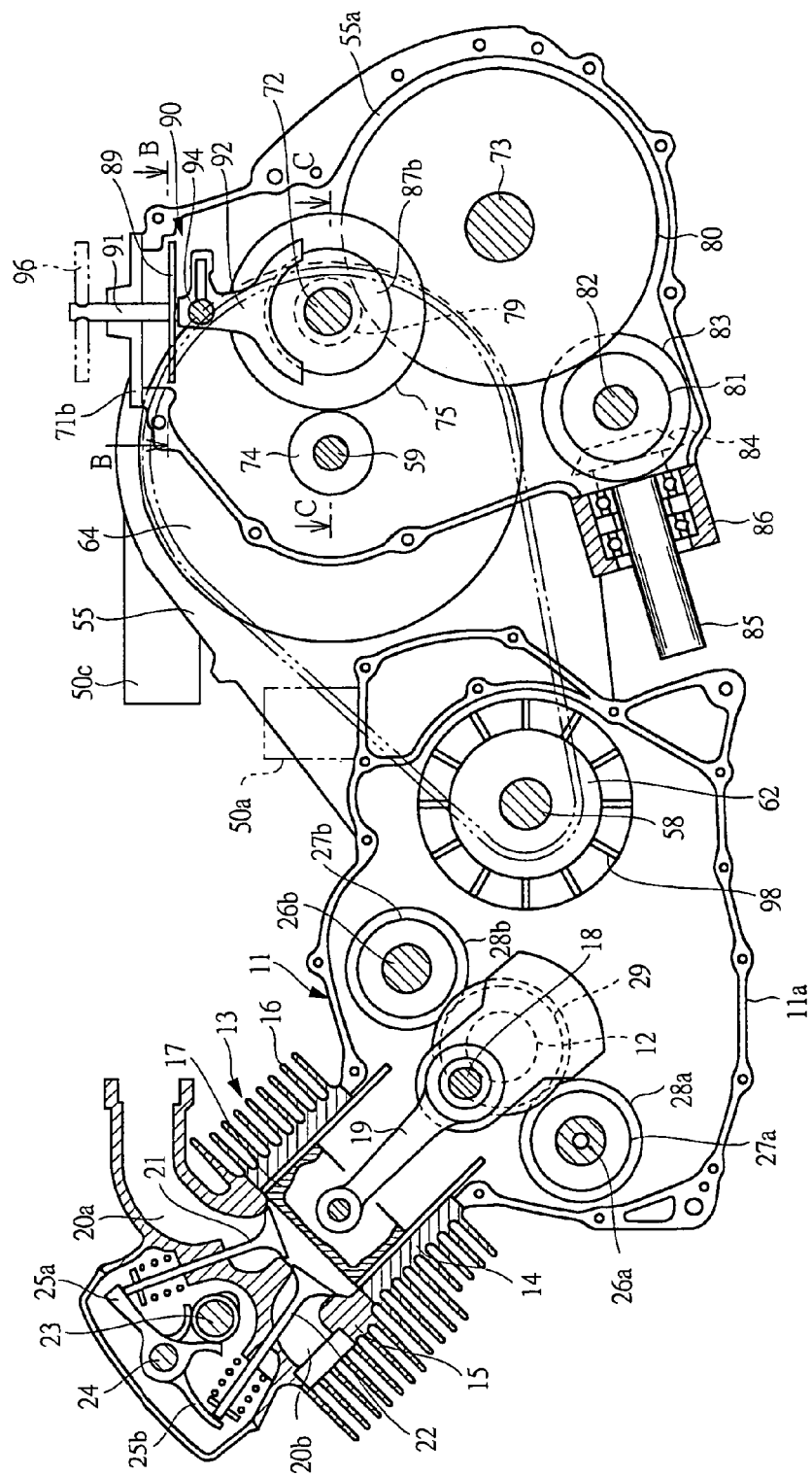
FIG. 3 is a cross sectional view along a line A-A in FIG. 2.

FIG. 2 is a schematic view showing a power transmission system mounted on the all-terrain vehicle shown in FIG. 1. FIG. 3 is a cross sectional view along a line A-A in FIG. 2. As shown in FIG. 2, a crankshaft 12 is rotatably mounted in a crankcase 11. The crankcase 11 has a case body 11a for supporting one end side of the crankshaft 12 rotatably via a bearing and a case body 11b that supports the other end side of the crankshaft 12 via a bearing and is combined with the case body 11a. The case body 11a is provided with an oil pump 10 and the rotor of this oil pump 10 is driven by the crankshaft 12 and the sliding portion of the power transmission system is supplied with lubricating oil through an oil passage (not shown).

The crankcase 11 is mounted with an engine 13 and the engine 13 is mounted in the vehicle body 1 such that the crankshaft 12 extends in the direction of vehicle width. The engine 13 has a cylinder 14 fixed to the crankcase 11 and a cylinder head 15 fixed to the top of this cylinder 14. This engine 13 is a single-cylinder air-cooled engine and the cylinder 14 and the cylinder head 15 are provided with heat radiation fins 16.

As shown in FIG. 3, a piston 17 is put in a cylinder bore formed in the cylinder 14 in such a way as to freely reciprocate. A connecting rod 19 is coupled to a crank pin 18 fixed to the crankshaft 12 at an eccentric position with respect to its rotary center and the piston 17. Then, the crankshaft 12 is rotated by the engine 13. An intake port 20a opening to a combustion chamber is formed in the cylinder head 15 and an intake valve 21 for opening or closing this intake port 20a is mounted on the cylinder head 15. Then, an exhaust port 20b opening to the combustion chamber is formed in the cylinder head 15 and an exhaust valve 22 for opening or closing this exhaust port 20b is mounted on the cylinder head 15.

A camshaft 23, as shown in FIG. 3, is rotatably mounted on the cylinder head 15. A rocker arm 25a for opening or closing the intake valve 21 and a rocker arm 25b for opening or closing the exhaust valve 22 are mounted on a rocker arm shaft 24 provided parallel to the camshaft 23 in such a way that they can freely turn. A chain (not shown) is looped between a sprocket (not shown) fixed to the camshaft 23 and a sprocket 12a fixed to the crankshaft 12 as shown in FIG. 2. Then, the intake valve 21 and the exhaust valve 22 are opened or closed at predetermined timings by the rotation of the crankshaft 12 via the camshaft 23 and the rocker arms 25a, 25b.

Balancer shafts 26a, 26b are rotatably mounted on the crankcase 11 via bearings. Then, the balancer shafts 26a, 26b are integrally provided with balancer weights 27a, 27b, respectively. Gears 28a, 28b each provided on the balancer shafts 26a, 26b, as shown in FIG. 2, are engaged with a gear 29 provided on the crankshaft 12 and rotational variations of the crankshaft 12 are absorbed by the balancers 27a, 27b. However, it is also recommended that two balancer shafts 26a, 26b are not provided but only one balance shaft is provided. Here, in FIG. 2 is shown one balancer shaft 26a of the two balancer shafts.

A sub-shaft 31, as shown in FIG. 2, is rotatably mounted parallel to the crankshaft 12 in the crankcase 11. An engine assembly 30 is constructed of the engine 13, the crankcase 11 mounted with the engine 13, the crankshaft and the sub-shaft 31 which are mounted in the crankcase 11, and the like. A gear 32 mounted on the sub-shaft 31 is engaged with a gear 33 mounted on the crankshaft 12 and the sub-shaft 31 is rotated when the crankshaft 12 rotates. These gears 32, 33 construct rotation transmitting members for transmitting the rotation of the crankshaft 12 to the sub-shaft 31 and are arranged outside the crankcase 11. Then, a generator case 34 is mounted on the case body 11b of the crankcase 11 in such a way as to cover these gears 32, 33.

A generator 35 is mounted in the generator case 34. The generator 35 has an outer rotor 37 provided with a magnet 36 and mounted on the crankshaft 12 and a stator 39 provided with a coil 38 and mounted on the generator case 34. Hence, when the engine 13 is operated to rotate the crankshaft 12, electric power generated by the generator 35 is charged into a battery (not shown).

In order to start the engine 13, a starter motor 41 is mounted in the generator case 34 and the rotation of the starter motor 41 is transmitted to the crankshaft 12 via gears 42a, 42b. In order to start the engine 13 by hand at a time when the amount of electric power charged in the battery is too small to start the engine 13, a recoil starter 44 is mounted on a recoil cover 43 mounted on the generator case 34. The recoil starter 44 has a recoil pulley 46 around which a recoil rope 45 is wound and which is rotatably mounted in the recoil cover 43. Then, when a recoil knob 45a fixed to the end of the recoil rope 45 is pulled to rotate the recoil pulley 46, an engaging member is engaged with a recoil drum 47 mounted on the sub-shaft 31 to rotate the crankshaft 12 via the sub-shaft 31, whereby the engine 13 can be started also by hand. A spring force in a direction to wind the recoil rope 45 around the recoil pulley 46 is applied to the recoil pulley 46 by a spring (not shown).

As shown in FIG. 2, a centrifugal clutch 48 is mounted on the sub-shaft 31. This centrifugal clutch 48 has a clutch drum 49 rotatably mounted in the crankcase 11 and a rotary disk 51 fixed to the sub-shaft 31. A plurality of arc-shaped clutch shoes 53 are turnably mounted on the rotary disk 51 with a pin 52, respectively. A spring force in a direction away from the inner peripheral surface of the clutch drum 49 is applied to the clutch shoes 53 by a spring 54. Hence, when the sub-shaft 31 is rotated by the crankshaft 12 at the number of revolutions more than a predetermined number, the clutch shoes 53 are engaged with the inner peripheral surface of the clutch drum 49 to rotate the clutch drum 49 integrally with the sub-shaft 31.

A transmission case 55 is mounted on the crankcase 11. The transmission case 55 has a case body 55a fixed to the crankcase 11 and a case body 55b fixed to the case body 55a and has a continuously variable transmission 57 mounted therein. The continuously variable transmission 57, that is, CVT is a belt type continuously variable transmission and has a primary shaft 58 rotatably mounted on the transmission case 55 via a bearing. The primary shaft 58 is concentric with the sub-shaft 31 and is coupled to the clutch drum 49 of the centrifugal clutch 48. In addition, a secondary shaft 59 is rotatably mounted parallel to the primary shaft 58 on the transmission case 55 via a bearing.

A transmission assembly 60 is constructed of the transmission case 55 mounted on the crankcase 11 with bolts and members such as the primary shaft 58 and the secondary shaft 59 which are mounted in the transmission case 55. In this manner, the transmission case 55 is fixed to the crankcase 11 with bolts. Hence, the transmission case 55 is separated from the crankcase 11, so that the engine assembly 30 and the transmission assembly 60 are independent assemblies. Therefore, it is possible to use the transmission assembly 60 as it is and to mount an engine assembly of the other type such as water-cooled engine in place of the air-cooled engine 13 shown in FIG. 3 on the transmission assembly 60. In this manner, an engine assembly of a different type can be mounted on a transmission assembly 60 of the same kind, so various kinds of power transmission systems can be manufactured with a small number of parts. Similarly, a transmission assembly of a different type can be also mounted on the engine assembly 30 of the same kind.

The primary shaft 58 has a fixed sheave 62a shaped into a conical surface 61a and a movable sheave 62b shaped into a conical surface 61b and opposed to the fixed sheave 62a The fixed sheave 62a is fixed to the primary shaft 58 and the movable sheave 62b is mounted on a spline formed on the primary shaft 58 in such a way as to freely move in an axial direction. These sheaves 62a, 62b form a primary pulley 62 having a variable groove width. On the other hand, the secondary shaft 59 has a fixed sheave 64a shaped into a conical surface 63a and a movable sheave 64b shaped into a conical surface 63b and opposed to the fixed sheave 64a. The fixed sheave 64a is fixed to the secondary shaft 59 and the movable sheave 64b is mounted on a spline formed on the secondary shaft 59 in such a way as to freely move in an axial direction. These sheaves 64a, 64b form a secondary pulley 64 having a variable groove width.

A V-belt made of rubber is looped over the primary pulley 62 and the secondary pulley 64. When the diameter of a loop of the V-belt 65 looped over the primary pulley 62 and the diameter of a loop of the V-belt 65 looped over the secondary pulley 64 are changed, the rotation of the primary shaft 58 is continuously varied in a transmission gear ratio and is transmitted to the secondary shaft 59. A plurality of cylindrical centrifugal weights, for example, six centrifugal weights 66 are mounted on the moving sheave 62b of the primary pulley 62 in a direction perpendicular to the rotary axis of the primary shaft 58. Then, a cam surface 67 is formed on the moving sheave 62b in correspondence with the centrifugal weights 66 on a surface opposite to the conical surface 61b and the outside portion of the cam surface 67 in a radial direction of the moving sheave 62b expands out toward the end of the primary shaft 58. A cam plate 68 is fixed to the primary shaft 58 in such a way as to oppose the cam surface 67 and the outside portion in a radial direction of the cam plate 68 is slanted in such a way as to be closer to the cam surface 67. On the other hand, in order to add a force for fastening the V-belt 65 to the moving sheave 64b, a spring rest 69 is fixed to the secondary shaft 59 and a compression coil spring 70 is mounted between the spring rest 69 and the moving sheave 64b.

Hence, when the number of revolutions of the primary shaft 58 is increased in a state where the number of revolutions of the crankshaft 12 is increased to the number of revolutions more than a predetermined number to bring the sub-shaft 31 to a state in which it is fastened to the primary shaft, the centrifugal weights 66 are moved to the outside in the radial direction by centrifugal forces applied thereto to narrow the groove width of the primary pulley 62 to increase the diameter of a loop of the V-belt 65 looped over this primary pulley 62. With this, the groove width of the secondary pulley 64 is widened against the spring force to decrease the diameter of a loop of the V-belt 65 looped over the secondary pulley 64 to vary the transmission gear ratio of the continuously variable transmission 57 to a higher speed side.

As described above, in this power transmission system, the crankshaft 12 is not concentric with but parallel to the primary shaft 58 and an assembly from the crankshaft 12 to the secondary shaft 59 which is the output shaft of the continuously variable transmission 57 has a three-axis structure and the centrifugal clutch 48 is provided between the primary shaft 58 and the sub-shaft 31 which is concentric with the primary shaft 58. Since the assembly from the crankshaft 12 to the secondary shaft 59 of the continuously variable transmission 57 has the three-axis structure in this manner, the power transmission system can be reduced in size in the direction of vehicle width to make a rider ride on or off the saddle type seat 4 with ease.

As shown in FIG. 2, a gear case 71 is mounted on the transmission case 55 and the end portions of the secondary shaft 59 are supported via bearings by the gear case 71. In addition, an output shaft 72 is rotatably mounted parallel to the secondary shaft 59 on the case body 55a of the transmission case 55 and the gear case 71 via bearings and an axle 73 is rotatably mounted parallel to the output shaft 72.

The secondary shaft 59 is integrally mounted with a gear 74 for forward rotation and the gear 74 is always engaged with a gear 75 rotatably mounted on the output shaft 72. In addition, the secondary shaft 59 is integrally mounted with a sprocket 76 for backward rotation. A chain 78 is looped over the sprocket 76 and a sprocket 77 rotatably mounted on the output shaft 72. The axle 73 is directly coupled to the rear wheels 3a, 3b shown in FIG. 1 and a gear 79 fixed to the output shaft 72 is always engaged with a gear 80 fixed to the axle 73 to form a gear train. The rotation of the output shaft 72 is directly transmitted to the axle 73 via the gear train, whereby the rear wheels 3a 3b of the driving wheels are driven by the axle 73. In this manner, engine power applied to the output shaft 72 is transmitted to the axle 73 via the gear train without using a chain or a shaft. Therefore, the power transmission system can be reduced in size and its manufacturing cost can be reduced.

While the axle 73 is coupled to the rear wheels 3a, 3b, in a case where not only the rear wheels 3a, 3b but also the front wheels 2a, 2b are driven, as shown in FIG. 3, a front wheel driving shaft 82 provided with a gear 81 engaged with the gear 80 is rotatably supported by the transmission case 55 and the gear case 71. The front wheel driving shaft 82 is provided with a bevel gear 83 and a driving shaft 85 provided with a bevel gear 84 engaged with the bevel gear 83 is rotatably supported by a support member 86 and the support member 86 is mounted on the case body 55a and the gear case 71.

When the rotation of the secondary shaft 59 is transmitted to the output shaft 72 via the gears 74, 75, the output shaft 72 is driven in a forward direction, and when the rotation of the secondary shaft 59 is transmitted to the output shaft 72 via the sprockets 76, 77 and the chain 78, the output shaft 72 is driven in a backward direction. In order to switch the rotational direction of the output shaft 72 to the forward direction and the backward direction, the output shaft 72 is provided with a forward/backward switching mechanism 90.

The forward/backward switching mechanism 90, as shown in FIG. 2, has a pair of switching disks 87a, 87b each engaged with the spline formed on the output shaft 72. These switching disks 87a, 87b are mounted on the output shaft 72 in such a way as to slide freely in an axial direction. One switching disk 87a is provided with engaging teeth 87c to be engaged with engaging teeth 75a provided on the side surface of the gear 75. In addition, the other switching disk 87b is provided with engaging teeth 87d to be engaged with engaging teeth 77a provided on the side surface of the sprocket 77. Therefore, when the switching disks 87a, 87b are moved toward the gear 75 to engage the engaging teeth 75a with the engaging teeth 87c, the rotation of the secondary shaft 59 becomes forward rotation and is transmitted to the axle 73 to move forward the vehicle. On the other hand, when the switching disks 87a, 87b are moved toward the sprocket 77 to engage the engaging teeth 77a with the engaging teeth 87d, the rotation of the secondary shaft 59 is changed into backward rotation via the sprockets 76, 77 and the chain 78 and is transmitted to the axle 73 to move backward the vehicle. Then, as shown in FIG. 2, when the switching disks 87a, 87b are moved to a neutral position where the switching disks 87a, 87b are not engaged with any engaging teeth, the rotation of the secondary shaft 59 is not transmitted to the axle 73.

The output shaft 72 is further mounted with a pair of switching disks 88a, 88b each engaging with the spline formed on the output shaft 72 in such a way as to slide freely in the axial direction. One switching disk 88*a* is provided with engaging teeth 88*c* to be engaged with engaging teeth 71*a* provided on the gear case 71. Hence, when the engaging teeth 88*c* of the switching disk 88*a* is engaged with the engaging teeth 71*a*, the output shaft 72 is fastened to the gear case 71, thereby being prevented from rotating. On the other hand, as shown in FIG. 2, when the engaging teeth 88*c* of the switching disk 88*a* is disengaged from the engaging teeth 71*a*, the output shaft 72 is brought into a state where it can freely rotate.

Figure 4:
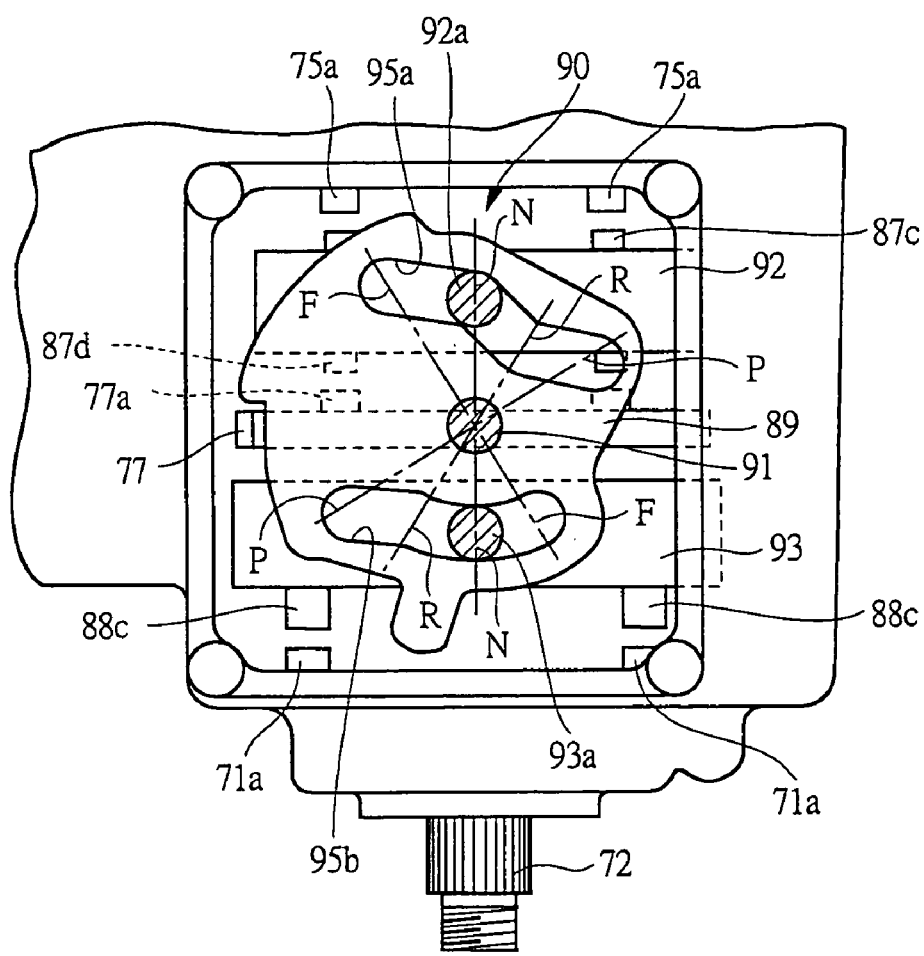
FIG. 4 is a cross sectional view along a line B-B in FIG. 3.
Figure 5:
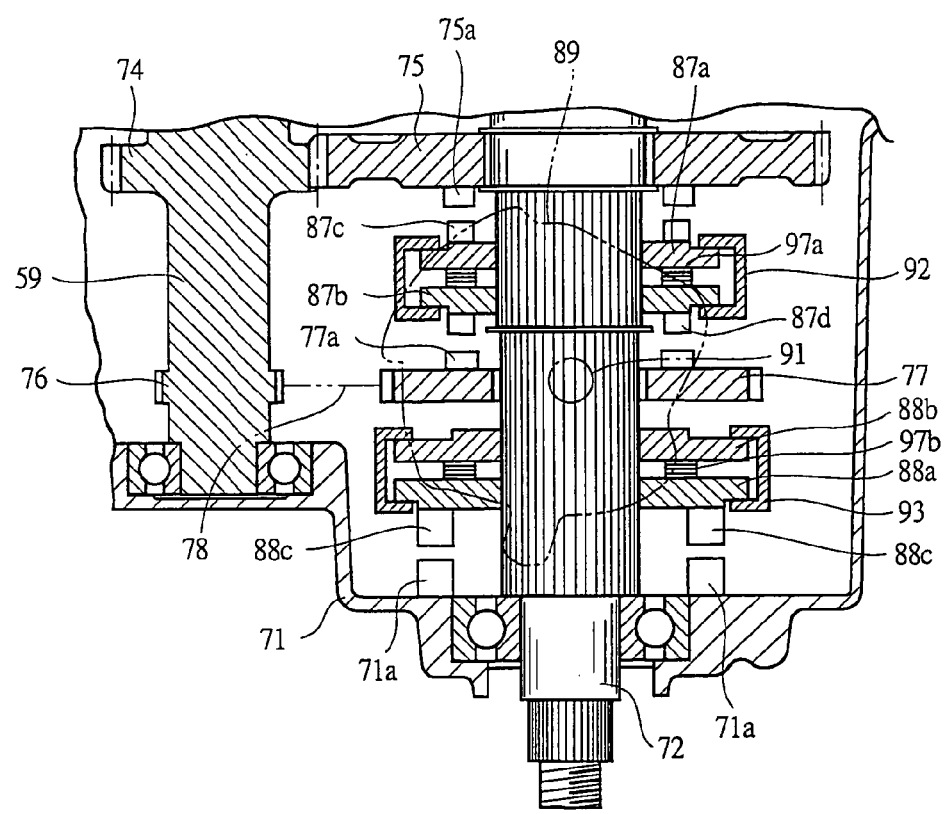
FIG. 5 is a cross sectional view along a line C-C in FIG. 3.

FIG. 4 is a cross sectional view along a line B-B in FIG. 3. FIG. 5 is a cross sectional view along a line C-C in FIG. 3. As shown in FIG. 3, a turning shaft 91 turnably mounted on a cover 71*b* fixed to the gear case 71 is mounted with a switching plate 89 for moving the switching disks 87*a* to 88*b* in the axial direction along the output shaft 72. As shown in FIG. 5, the two switching disks 87*a*, 87*b* are rotatably received in a switching holder 92 and the two switching disks 88*a*, 88*b* are rotatably received in a switching holder 93 and both of the switching holders 92, 93, as shown in FIG. 3, are slidably fitted on a guide rod 94 fixed to the gear case 71.

In the switching plate 89, as shown in FIG. 4, are formed a cam groove 95*a* with which an engaging pin 92*a* provided in the switching holder 92 is engaged and a cam groove 95*b* with which an engaging pin 93*a* provided in the switching holder 93 is engaged. The turning shaft 91, as shown in FIG. 3, is mounted with an operating link 96 and, as shown in FIG. 1, a switching lever 6 provided in the vehicle is coupled to the operating link 96. When the rider operates the switching lever 6, the switching plate 89 is turned via the operating link 96. When the operating link 89 is turned, the two pairs of switching disks 87*a* to 88*b* are guided by the guide rod 94, thereby being slid along the output shaft 72.

FIG. 4 and FIG. 5 show the position of the switching plate 89 in a state where the switching lever 6 is operated to a neutral position, that is, an N-position. When the switching plate 89 is operated by the switching lever 6 to a forward position, that is, to an F-position, the engaging teeth 87*c* of the switching disk 87*a* are engaged with the engaging teeth 75*a* of the gear 75. On the other hand, the switching plate 89 is operated by the switching lever 6 to a retracted position, that is, to an R-position, the engaging teeth 87*d* of the switching disk 87*b* are engaged with the engaging teeth 77*a* of the sprocket 77. When the switching plate 89 is operated to a neutral position, that is, to an N-position, the switching disks 87*a*, 87*b* are brought into a neutral position, as shown in FIG. 5. Then, when the switching plate 89 is operated to a parking position, that is, to a P-position, the switching disks 87*a*, 87*b* are brought into the same position as the neutral position.

When the switching plate 89 is operated to the P-position, the engaging teeth 88*c* of the switching disk 88*a* is engaged with the engaging teeth 71*a* of the gear case 71, and when the switching plate 89 is operated to the N-position, the F-position and the R-position, the engaging teeth 88*c* of the switching disk 88*a* are brought to a position where they are disengaged from the engaging teeth 71*a*. As shown in FIG. 5, a spring 97*a* for applying a spring force in a direction to separate the switching disks 87*a*, 87*b* from each other is mounted between the two switching disks 87*a*, 87*b* to damp switching shock. Similarly, a spring 97*b* is mounted also between the switching disks 88*a*, 88*b*.

In order to cool the primary pulley 62, the secondary pulley 64 and the V-belt 65 that construct the continuously variable transmission system 57, outside air is supplied into the transmission case 55. For this purpose, the crankcase 11, as shown in FIG. 2 and FIG. 3, is provided with an intake duct 50*a* and the transmission case 55 is provided an exhaust duct 50*c*. The outside air flowing through the intake duct 50*a* flows into the transmission case 55 and then is discharged outside from the exhaust duct 50*c*. In order to produce cooling wind in the transmission case 55, a fan blade 98 is mounted in a manner extending in the radial direction on the back surface of the fixed sheave 62*a* of the primary pulley 62 and fan blades 99*a*, 99*b* are mounted in a manner extending in the radial direction on the back surfaces of the respective sheaves 64*a*, 64*b* of the secondary pulley 64.

In order to brake the running vehicle, as shown in FIG. 2, the output shaft 72 is mounted with a brake disk 100 and the gear case 71 is provided with a brake holder 101 for activating a brake pad (not shown) to be put into contact with the brake disk 100. When a brake lever mounted on the handlebar 5 is operated, the brake pad is put into contact with the brake disk 100 to apply a braking force to the output shaft 72.

In the power transmission system described above, when the engine 13 is started by the starter motor 41 to rotate the crankshaft 12, the sub-shaft 31 mounted parallel to the crankshaft 12 in the crankcase 11 is driven by the crankshaft 12 via the gears 32, 33 as rotation transmitting members. When the number of rotations of the sub-shaft 31 becomes larger than a predetermined number, the sub-shaft 31 is directly coupled to the primary shaft 58 via the centrifugal clutch 48 to rotate the primary pulley 62. When the primary pulley 62 is rotated, the rotation of the primary pulley 62 is transmitted to the secondary pulley 64 via the V-belt 65. With this, the rotation of the secondary shaft 59 is transmitted to the output shaft 72.

When the driver operates the switching lever 6 shown in FIG. 1 to engage the engaging teeth 87*c* of the switching disk 87*a* with the engaging teeth 75*a* of the gear 75, the rotation of the secondary shaft 59 is transmitted to the output shaft 72 via the gears 74, 75 in such a way as to rotate the output shaft 72 in the forward direction, whereby the vehicle is moved forward. On the other hand, when the driver operates the switching lever 6 shown in FIG. 1 to engage the engaging teeth 87*d* of the switching disk 87*b* with the engaging teeth 77*a* of the sprocket 77, the rotation of the secondary shaft 59 is transmitted to the output shaft 72 via the sprockets 76, 77 and the chain 78 in such a way as to rotate the output shaft 72 in the backward direction, whereby the vehicle is moved backward. When the continuously variable transmission 57 is rotated as in the cases where the vehicle is moved forward or backward, the cooling wind is produced in the transmission case 55 to cool the V-belt 65 made of rubber and the pulleys 62, 64.

When the switching disks 87*a*, 87*b* are operated to a state where their engaging teeth are not engaged with any engaging teeth, the power transmission system brought into a neutral state where the rotation of the secondary shaft 59 is not transmitted to the output shaft 72. Further, when the switching lever 6 is operated to the parking position, the engaging teeth 88*c* of the switching disk 88*a* are engaged with the engaging teeth 71*a* to bring the output shaft 72 into a state where the output shaft 72 is fastened to the gear case 71.

As described above, this power transmission system has the three-axis structure in which the crankshaft 12 and the primary shaft 58 and the secondary shaft 59 of the continuously variable transmission 57 are arranged parallel to each other and can transmit the rotation of the crankshaft 12 to the primary shaft 58 via the sub-shaft 31 concentric with the primary shaft 58. Hence, this power transmission system can be reduced in size in a direction of vehicle width. Further, the three-axis structure makes it possible to support the axle 73 by the transmission case 55 and the gear case 71 and to drive the driving wheels 3a, 3b directly by the axle 73 coupled to the output shaft 72 by the gears 79, 80. Still further, in this power transmission system, the engine assembly 30 mounted in the crankcase 11 is independent of the transmission assembly 60 mounted in the transmission case 55, so the engine assembly 60 of the same kind can be mounted with a different kind of engine.

It should be understood that the present invention is not limited to the preferred embodiment described above but can be variously modified within the spirit and scope of the present invention. For example, as shown in FIG. 3, in this power transmission system, the front wheels 2a, 2b and the rear wheels 3a, 3b are driven. However, it is also recommended that the front wheel driving shaft 82 be not provided but only the rear wheels 3a, 3b be driven.

According to the present invention, the crankshaft is arranged parallel to the primary shaft of the continuously variable transmission and the sub-shaft which is arranged parallel to the crankshaft and to which the rotation of the crankshaft is transmitted by the rotation transmitting members is arranged concentrically with the primary shaft, so this power transmission system has the three-axis structure in which the crankshaft, the primary shaft and the secondary shaft are arranged parallel to each other. With this, it is possible to reduce the power transmission system in size in a direction of width of the vehicle in a case where the engine is mounted in a lateral direction in the vehicle body. Moreover, since the power transmission system mounted below the saddle type seat is reduced in size in the direction of vehicle width, the rider can easily ride on or off the vehicle.

The entire disclosure of Japanese Patent Application No. 2003-82238 filed on Mar. 25, 2003 including specification, claims, drawings and summary is incorporated herein by reference in its entirety.

What is claimed is:

1. A power transmission system of an engine for transmitting engine power to a driving wheel, said power transmission system comprising:
   a crankshaft driven by the engine, said crankshaft being arranged in a vehicle body in a widthwise direction of the vehicle body;
   a sub-shaft which is arranged parallel to said crankshaft and non-concentric with the crankshaft and to which the rotation of said crankshaft is transmitted via a rotary transmission member; and
   a belt type continuously variable transmission including a primary shaft and a secondary shaft, said primary shaft being arranged concentrically with said sub-shaft and provided with a primary pulley having a variable groove width; said secondary shaft provided with a secondary pulley coupled to said primary pulley via a belt and having a variable groove width,
   wherein the rotation of said crankshaft is transmitted to said primary shaft via said sub-shaft, and said crankshaft is arranged parallel to said primary shaft, and
   a clutch member is arranged between said sub-shaft and said primary shaft and, relative to a lineal frame of reference extending in common with a rotation axis of said sub-shaft, said clutch member is disposed along said sub-shaft between said primary pulley and a drive engagement location of said rotary transmission member with said sub-shaft.

2. The power transmission system of an engine according to claim 1, wherein said clutch member is a centrifugal clutch that has a casing that is secured to an interior end of said primary shaft and extends around and past in overlapping fashion an opposing, interior end of said sub-shaft.

3. The power transmission system of an engine according to claim 1, wherein said clutch transmits and interrupts the rotation of said sub-shaft to said primary shaft.

4. The power transmission system of an engine according to claim 1, comprising:
   a crankcase that mounts said crankshaft, and
   wherein said clutch member is arranged in said crankcase.

5. The power transmission system of an engine according to claim 1, wherein said crankshaft is arranged in front of said primary shaft in a longitudinal direction of the vehicle body.

6. The power transmission system of an engine according to claim 1, wherein said secondary shaft is arranged behind said primary shaft in a longitudinal direction of the vehicle body.

7. The power transmission system of an engine according to claim 1, wherein said rotary transmission member is a pair of gears mounted on said sub-shaft and said crankshaft.

8. The power transmission system of an engine according to claim 1, wherein said crankshaft is mounted with a generator.

9. The power transmission system of an engine according to claim 8, wherein said sub-shaft is mounted with a recoil starter.

10. The power transmission system of an engine according to claim 1, comprising:
    a generator; and
    a recoil starter;
    wherein said generator and said recoil starter are mounted on different axes among said crankshaft and said sub-shaft.

11. The power transmission system of an engine according to claim 10, wherein said crankshaft is mounted with a generator.

12. The power transmission system of an engine according to claim 10, wherein said sub-shaft is mounted with a recoil starter.

13. A power transmission system of an engine for transmitting engine power to a driving wheel, said power transmission system comprising:
    a crankshaft driven by the engine, said crankshaft being arranged in a vehicle body in a widthwise direction of the vehicle body;
    a sub-shaft which is arranged parallel to said crankshaft and non-concentric with the crankshaft and to which the rotation of said crankshaft is transmitted via a rotary transmission member; and
    a belt type continuously variable transmission including a primary shaft and a secondary shaft, said primary shaft being arranged concentrically with said sub-shaft and provided with a primary pulley having a variable groove width; said secondary shaft provided with a secondary pulley coupled to said primary pulley via a belt and having a variable groove width, wherein the rotation of said crankshaft is transmitted to said primary shaft via said sub-shaft, and said crankshaft is arranged parallel to said primary shaft,
    a clutch member is arranged between said sub-shaft and said primary shaft, and wherein said clutch member is a centrifugal clutch.

14. A power transmission system of an engine for transmitting engine power to a driving wheel, said power transmission system comprising:

a crankshaft driven by the engine, said crankshaft being arranged in a vehicle body in a widthwise direction of the vehicle body;

a sub-shaft which is arranged parallel to said crankshaft and non-concentric with the crankshaft and to which the rotation of said crankshaft is transmitted via a rotary transmission member; and a belt type continuously variable transmission including a primary shaft and a secondary shaft, said primary shaft being arranged concentrically with said sub-shaft and provided with a primary pulley having a variable groove width; said secondary shaft provided with a secondary pulley coupled to said primary pulley via a belt and having a variable groove width, wherein the rotation of said crankshaft is transmitted to said primary shaft via said sub-shaft, and said crankshaft is arranged parallel to said primary shaft, a clutch member is arranged between said sub-shaft and said primary shaft and, relative to a lineal frame of reference extending in common with a rotation axis of said sub-shaft, said clutch member is disposed along said sub-shaft between said primary pulley and a drive engagement location of said rotary transmission member with said sub-shaft, and said sub-shaft is mounted with a recoil starter.

15. The power transmission system of an engine according to claim 14, wherein said clutch transmits and interrupts the rotation of said sub-shaft to said primary shaft.

16. The power transmission system of an engine according to claim 14, wherein, relative to said lineal frame of reference extending in common with a rotation axis of said sub-shaft, there is lacking an overlap between said sub-shaft and said primary shaft.

17. A power transmission system of an engine for transmitting engine power to a driving wheel, said power transmission system comprising:

a crankshaft driven by the engine, said crankshaft being arranged in a vehicle body in a widthwise direction of the vehicle body;

a sub-shaft which is arranged parallel to said crankshaft and non-concentric with the crankshaft and to which the rotation of said crankshaft is transmitted via a rotary transmission member; and a belt type continuously variable transmission including a primary shaft and a secondary shaft, said primary shaft being arranged concentrically with said sub-shaft and provided with a primary pulley having a variable groove width; said secondary shaft provided with a secondary pulley coupled to said primary pulley via a belt and having a variable groove width, wherein the rotation of said crankshaft is transmitted to said primary shaft via said sub-shaft, and said crankshaft is arranged parallel to said primary shaft, a clutch member is arranged between said sub-shaft and said primary shaft, and wherein, relative to a lineal frame of reference extending in common with a rotation axis of said sub-shaft, there is lacking an overlap between said sub-shaft and said primary shaft.

18. A power transmission system of an engine for transmitting engine power to a driving wheel, said power transmission system comprising:

a crankshaft driven by the engine, said crankshaft being arranged in a vehicle body in a widthwise direction of the vehicle body;

a sub-shaft which is arranged parallel to said crankshaft and non-concentric with the crankshaft and to which the rotation of said crankshaft is transmitted via a rotary transmission member; and a belt type continuously variable transmission including a primary shaft and a secondary shaft, said primary shaft being arranged concentrically with said sub-shaft and provided with a primary pulley having a variable groove width; said secondary shaft provided with a secondary pulley coupled to said primary pulley via a belt and having a variable groove width, wherein the rotation of said crankshaft is transmitted to said primary shaft via said sub-shaft, and said crankshaft is arranged parallel to said primary shaft, a clutch member is arranged between said sub-shaft and said primary shaft, and said sub-shaft is mounted with a recoil starter, and wherein said clutch member is a centrifugal clutch that has a casing that is secured to an interior end of said primary shaft and extends around and past in overlapping fashion an opposing, interior end of said sub-shaft.

* * * * *